US009009678B2

(12) United States Patent
Bates (10) Patent No.: US 9,009,678 B2
(45) Date of Patent: Apr. 14, 2015

(54) SOFTWARE DEBUGGING WITH EXECUTION MATCH DETERMINATIONS (75) Inventor: Cary L. Bates, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 866 days.

(21) Appl. No.: 13/170,846

(22) Filed: Jun. 28, 2011

(65) Prior Publication Data
US 2013/0007718 A1 Jan. 3, 2013

(51) Int. Cl.
G06F 9/44 (2006.01)
G06F 9/45 (2006.01)
G06F 11/36 (2006.01)
G06F 9/445 (2006.01)

(52) U.S. Cl.
CPC ............. G06F 11/362 (2013.01); G06F 9/445 (2013.01)

(58) Field of Classification Search
None
See application file for complete search history.

(56) References Cited

U.S. PATENT DOCUMENTS

| 5,533,192 | A | 7/1996 | Hawley et al. | |
| 6,256,777 | B1* | 7/2001 | Ackerman | 717/129 |
| 6,826,717 | B1 | 11/2004 | Draper et al. | |
| 7,096,458 | B2* | 8/2006 | Bates et al. | 717/124 |
| 7,401,323 | B2* | 7/2008 | Stall et al. | 717/130 |
| 7,849,450 | B1* | 12/2010 | Rydh et al. | 717/131 |
| 7,853,929 | B2* | 12/2010 | Klein | 717/129 |
| 8,219,980 | B2* | 7/2012 | Bates et al. | 717/129 |
| 8,572,577 | B2* | 10/2013 | Bates et al. | 717/129 |
| 2002/0144245 | A1* | 10/2002 | Lueh | 717/140 |
| 2003/0061542 | A1 | 3/2003 | Bates et al. | |
| 2003/0084430 | A1* | 5/2003 | Bates et al. | 717/131 |
| 2003/0149961 | A1* | 8/2003 | Kawai et al. | 717/129 |
| 2004/0205702 | A1 | 10/2004 | Logan et al. | |
| 2004/0210876 | A1* | 10/2004 | Stall et al. | 717/127 |
| 2006/0174225 | A1* | 8/2006 | Bennett et al. | 717/124 |
| 2006/0294347 | A1 | 12/2006 | Zou et al. | |
| 2007/0168996 | A1* | 7/2007 | Klein | 717/129 |
| 2007/0283330 | A1 | 12/2007 | Bates | |
| 2008/0168428 | A1* | 7/2008 | Bates et al. | 717/129 |
| 2009/0089764 | A1 | 4/2009 | Lai et al. | |
| 2009/0320001 | A1* | 12/2009 | Bates et al. | 717/129 |
| 2010/0199265 | A1* | 8/2010 | Maybee | 717/130 |

(Continued)

OTHER PUBLICATIONS

Hanson, D., et al., A Simple and Extensible Graphical Debugger, ATEC '97 Proceedings of the USENIX Annual Technical Conference, 1997, 12 pages, [retrieved on Nov. 29, 2014], Retrieved from the Internet: <URL:http://cutebugs.net/files/debugging/hanson97simple.pdf>.*

(Continued)

Primary Examiner — Thuy Dao
Assistant Examiner — Geoffrey St Leger
(74) Attorney, Agent, or Firm — Biggers Kennedy Lenart Spraggins, LLP (57) ABSTRACT Software debugging with execution match determinations, including: inserting, by a compiler while compiling source code into a debuggable program, a phantom breakpoint at every line of source code; including in the debuggable program, by the compiler, a breakpoint handling module and an exit handler; executing the debuggable program including encountering one or more of the phantom breakpoints and removing, by the breakpoint handling module, each encountered phantom breakpoint; creating, by the exit handler, upon exiting execution of the debuggable program, a copy of the debuggable program that includes only phantom breakpoints not encountered during execution; and providing the copy of the debuggable program to a debugger.

18 Claims, 6 Drawing Sheets (56) References Cited

U.S. PATENT DOCUMENTS

2011/0035731 A1*   2/2011   Pericin .................... 717/129
2012/0102464 A1*   4/2012   Bates ..................... 717/125
2012/0110555 A1*   5/2012   Bates et al. ............. 717/129
2013/0031534 A1    1/2013   Bates

OTHER PUBLICATIONS

Iles, A., Mechanism for Generating Counted Hardware Breakpoints Utilizing an External Cpu Pipeline Model, IP.com Prior Art Database Technical Disclosure, Dec. 1997, [retrieved on Nov. 29, 2014], Retrieved from the Internet: <URL:http://ip.com/>.*

Calder et al., "BugNet: Recording Application-Level Execution for Deterministic Replay Debugging", IEEE Micro Online Magazine, Jan.-Feb. 2006, pp. 100-109, vol. 26, No. 1, IEEE Computer Society, USA.

Marks, "Debugging Applications With IntelliTrace", MSDN Magazine, Apr. 2010, pp. 36-45 Microsoft, USA.

* cited by examiner

SOFTWARE DEBUGGING WITH EXECUTION MATCH DETERMINATIONS

BACKGROUND OF THE INVENTION

1. Field of the Invention

The field of the invention is data processing, or, more specifically, methods, apparatus, and products for software debugging with execution match determinations.

2. Description of Related Art

Often software debugging is initiated in response to an error in execution of the software outside of a debugging environment. That is, an execution preceding debugging results in one or more errors—a crash, a buffer overflow, an execution freeze, and so on. Once the software is being debugged, it would be useful for a software developer to be certain that execution in the debugging environment was the same as the execution that preceded debugging. That is, having a controlled testing environment where conditions are the same as the conditions in which the execution resulted in errors is useful, but at present, debugging tools cannot insure that such conditions are the same or inform a user when the conditions are not the same.

SUMMARY OF THE INVENTION

Methods, apparatus, and products for software debugging with execution match determinations are disclosed. Such software debugging may be carried out with a compiler and a debugger. From the compiler's perspective software debugging includes: inserting, by a compiler while compiling source code into a debuggable program, a phantom breakpoint at one or more lines of source code; including in the debuggable program, by the compiler, a breakpoint handling module and an exit handler; executing the debuggable program including encountering one or more of the phantom breakpoints and removing, by the breakpoint handling module, each encountered phantom breakpoint; creating, by the exit handler, upon exiting execution of the debuggable program, a copy of the debuggable program that includes only phantom breakpoints not encountered during execution; and providing the copy of the debuggable program to a debugger.

From the debugger's perspective, software debugging includes: receiving the copy of a debuggable program; identifying, by the debugger, lines of source code of the copy of the debuggable program that do not include a phantom breakpoint; inserting, by the debugger, an executed phantom breakpoint at one or more of the identified lines of source code of the copy of the debuggable program; executing, by the debugger, the copy of the debuggable program including, removing any phantom or executed phantom breakpoint; and, after exiting execution of the copy of the debuggable program, determining, by the debugger, whether execution of the copy of the debuggable program matches the execution of the debuggable program including, determining that the executions do not match if any phantom breakpoints were removed during execution of the copy of the debuggable program or any executed phantom breakpoint remain after exiting execution of the copy of the debuggable program.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
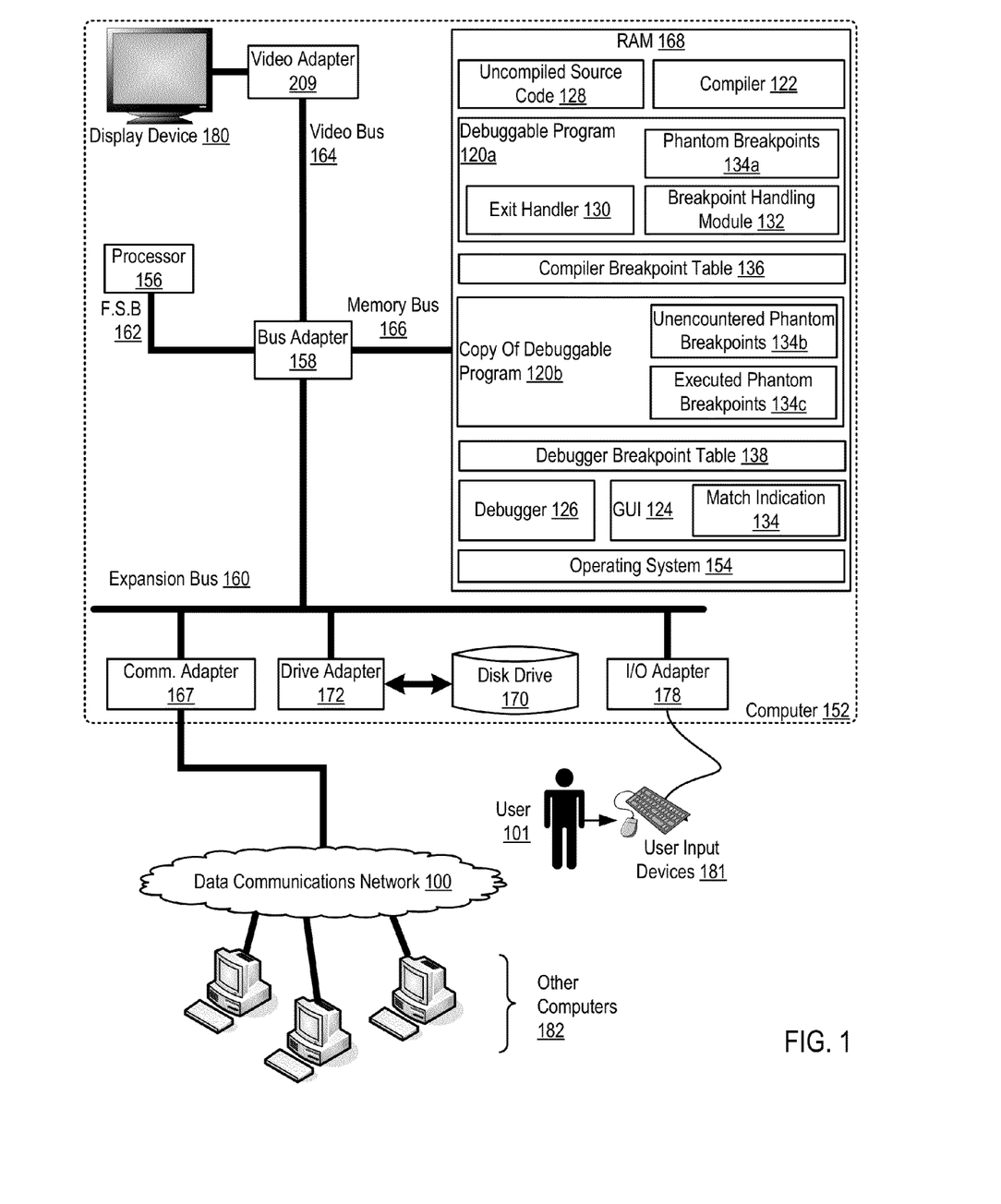
FIG. 1 sets forth a block diagram of automated computing machinery forming a system for software debugging with execution match determinations according to embodiments of the present invention.

Exemplary methods, apparatus, and products for software debugging with execution match determinations in accordance with the present invention are described with reference to the accompanying drawings, beginning with FIG. 1. FIG. 1 sets forth a block diagram of automated computing machinery forming a system for software debugging with execution match determinations according to embodiments of the present invention. The system of FIG. 1 includes an exemplary computer (152) that, in turn, includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a debugger (126). A debugger (126) is an application that controls operation of another application—a debuggee, or 'a debuggable program' (120a, 120b)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI (124).

Also stored in RAM (168) is a compiler (122). A compiler is a module of computer program instructions that transforms source code written in a programming language (the source language) into another computer language (the target language, often having a binary form known as object code). The most common transformation of source code creates an executable program. The compiler (122) of FIG. 1 is also configured to generate a debuggable program (120a)—the debuggee.

In the example of FIG. 1, the compiler (122) and the debugger (126) support software debugging with execution match determinations in accordance with embodiments of the present invention. The compiler (122) operates for software debugging with execution match determinations by inserting, while compiling source code (128) into a debuggable program (120a), a phantom breakpoint (134a) at one or more lines of source code. In some embodiments, the compiler (122) inserts a phantom breakpoint at every line of source code while in other embodiments, a user may specify the one or more lines of source code at which to insert a phantom breakpoint. A breakpoint is one or more predefined instructions inserted into debuggee source code that, when executed, cause debuggee execution to pause or stop. The breakpoint instructions typically replace or 'overlay' original source code instructions. In some embodiments, a breakpoint is implemented as a particular operational code, 'opcode,' that when executed is trapped and handled by a particular module. In other embodiments, a breakpoint may be implemented by a code that results in an error or causes an interrupt. In this specification, a breakpoint is described as a 'phantom' when a compiler inserts the breakpoint and when a user is relatively unaware of the existence of the breakpoint, the insertion of the breakpoint, and the handling of the breakpoint when encountered during execution.

The example compiler (122) of FIG. 1 also supports software debugging with execution match determinations by including in the debuggable program (120a) a breakpoint handling module (132) and an exit handler (130). A breakpoint handling module (132) is a module of computer program instructions configured to administer phantom breakpoint encounters during execution of the debuggable program. Including such a module in a debuggable program may be carried out ways, such as, for example, including in an executable package forming the debuggable program, one or more dynamically linked libraries that include routines forming the breakpoint handling module and inserting into the source code linking instructions for the DLLs.

An exit handler is a module of computer program instructions that runs upon completion of a program's execution. Including an exit handler in the debuggable program may be carried out in various ways including, for example, including one or more DLLs that include routines forming the exit handler and inserting in the debuggable program instructions to register the exit handler with the operating system. Once registered, the exit handler will be executed at the behest of the operating system upon the debuggable program exiting by, for example, calling the system-level "exit( )" function in a Unix™-style operating system environment.

The compiler (122) may insert the phantom breakpoints (134) by replacing, at one or more lines of source code, original source code with a phantom breakpoint, storing the original source code, and generating a breakpoint table (136).

The compiler breakpoint table (136) includes an entry for each phantom breakpoint inserted in the source code. Each entry in the compiler breakpoint table (136) references the original source code replaced by the phantom breakpoint. That is, each entry includes a pointer to a memory location at which the original source code is stored.

The example compiler (122) of FIG. 1 also supports software debugging with execution match determinations by executing the debuggable program (120a). During execution, one or more of the phantom breakpoints are encountered and the breakpoint handling module (132) removes each encountered phantom breakpoint. The breakpoint handling module (132) may remove the encountered phantom breakpoints by replacing the encountered phantom breakpoint with original source code through use of the compiler breakpoint table (136).

The exit handler (130), upon exiting execution of the debuggable program (120a), creates a copy of the debuggable program that includes only phantom breakpoints not encountered during execution. In operation, only a portion of the debuggable program (120a) may be copied into RAM (168) during and for execution while a complete version of the debuggable program (120a) may be stored on a disk drive (170). The exit handler (130) may be configured to compare the portion of the debuggable program (120a) in RAM (168) with the version of the debuggable program (120a) in disk drive (170) to insure that any encounters of phantom breakpoints in the portion in RAM (168) is captured by in the created copy (120b).

The compiler (122) may then provide the copy (120b) of the debuggable program to the debugger (126). Upon receipt, the debugger (126) may identify lines of source code of the copy (120b) of the debuggable program that do not include a phantom breakpoint and insert an executed phantom breakpoint at one or more of the identified lines of source code of the copy of the debuggable program. An executed phantom breakpoint is a breakpoint, inserted into a copy of a debuggable program by a debugger, at a line of source code that does not include a phantom breakpoint originally inserted by a compiler. Said another way, an executed phantom breakpoint effectively represents a line of source code that was executed in a previous execution of the debuggable program. The debugger (126) while inserting the executed phantom breakpoints may replace original source code of the copy (120b) with one or more predefined breakpoint instructions or opcode, store the original source code of the copy (120b), and create a debugger breakpoint table (138). Each entry of the debugger breakpoint table (138) represents a breakpoint in source code of the copy (120b) of the debuggable program. Each entry may also specify a memory location of the original source code that was removed from the copy (120b) upon insertion of the breakpoint. In some embodiments, the debugger's breakpoint table (138) may also be used as the debugger's primary breakpoint table where entries represent any type of breakpoint including breakpoints specified by a user. In such embodiments, each entry of the breakpoint table may also specify the type of breakpoint represented by the entry— such as "user-specified," "executed phantom," or "phantom." Alternatively, the debugger may maintain separate tables for each type of breakpoint.

After insertion of the executed phantom breakpoints, the debugger (126) in the example of FIG. 1 may execute the copy (120b) of the debuggable program. During execution, the debugger (126) removes, without user interaction, any phantom or execution phantom breakpoint. Upon completion of execution, the copy (120b) of the debuggable program exits execution.

After exiting execution, the debugger (126) in the example of FIG. 1 determines whether execution of the copy (120a) of the debuggable program matches the execution of the debuggable program. The debugger (126) determines that the executions do not match if any phantom breakpoints (134b) were removed during execution of the copy of the debuggable program or any executed phantom breakpoint (134c) remains after exiting execution of the copy of the debuggable program. If any phantom breakpoints (134b) were removed during execution of the copy of the debuggable program, the copy (120b) executed lines of source code not originally executed during the preceding execution. Thus, the executions do not match. If any executed phantom breakpoint (134c) remain after exiting execution of the copy of the debuggable program, lines of source code originally executed in the preceding execution where not executed during the subsequent execution of the copy (120b) of the debuggable program under debugger control. Thus, the executions do not match. In the example of FIG. 1, the debugger (126) may display, in a graphical user interface ('GUI') (126), an indication (134) of matching or non-matching execution corresponding to the outcome of the execution match determination.

Also stored in RAM (168) is an operating system (154). Operating systems that support software debugging with execution match determinations according to embodiments of the present invention include UNIX™, Linux™, Microsoft XP™, AIX™, IBM's i5/OS™, and others as will occur to those of skill in the art. The operating system (154), debugger (126), compiler (122), GUI (124), and debuggee (120) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support software debugging with execution match determinations according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support software debugging with execution match determinations according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
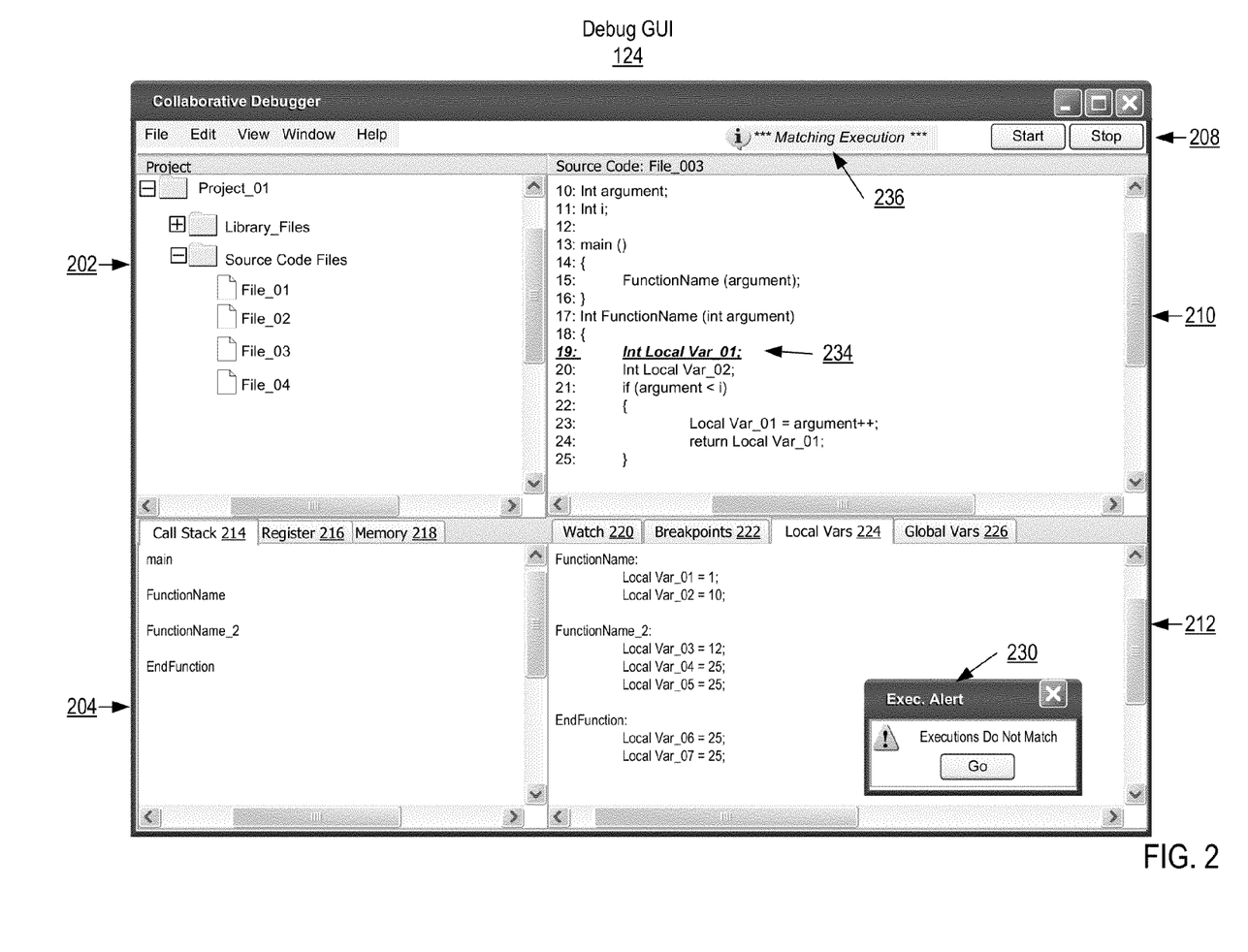
FIG. 2 sets forth an example GUI presented to a user by a debugger in accordance with embodiments of the present invention.

For further explanation, FIG. 2 sets forth an example GUI (124) presented to a user by a debugger in accordance with embodiments of the present invention. The example GUI (124) of FIG. 2 provides an interface for a user to control operation of a debugger and thereby a debuggee. The debugger presenting the example GUI (124) of FIG. 2 is configured for software debugging with execution match determinations in accordance with embodiments of the present invention.

The example GUI (124) of FIG. 2 includes a menu bar (208) that, in turn, includes a number of separate menus: a File menu, an Edit menu, a View menu, and a Help menu. The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the multi-threaded debuggee. The data panes (204, 212) present various data useful in debugging the source code. In the example of FIG. 2, data pane (204) includes three tabs, each of which presents different data: a call stack tab (214), a register tab (214), and a memory tab (218) tab. Data pane (212) includes four tabs: a watch list tab (220), a breakpoints (222) tab, a local variable tab (224), and a global variable tab (226).

The example GUI (124) of FIG. 2 sets forth various indications of matching and non-matching execution. Readers of skill in the art will recognize that in many embodiments only one indication will be displayed at a time. Further, even in embodiments in which multiple indications are displayed simultaneously in a GUI (124), only one type (matching or non-matching execution) of indication will be displayed at one time.

The debugger presenting the example GUI (124) of FIG. 2 displays an indication (230) of non-matching execution upon determining that a preceding execution outside of the debugging environment and the most recent execution within the debugging environment of the debuggable program do not match. The example indication (230) of non-matching execution is implemented as a pop-up dialog box titled "Exec. Alert," including a warning symbol and text that reads, "Executions Do Not Match." The example indication (230) implemented as a pop-up dialog box also includes a GUI button with text reading "Go." The GUI button, when invoked, may change the perspective (the display) of the GUI to present one or more source code lines at which execution did not match. That is, the GUI may display source code lines that include an executed phantom breakpoint (indicating that the line was executed in the preceding execution but not during execution under debug control) or source code lines from which a phantom breakpoint was removed (indicating that the line was not executed in the preceding execution but was executed under debug control).

The example GUI (124) of FIG. 2 also includes another indication (234) of non-matching execution at line 19 of the source code displayed in the source code pane (219). The indication (234) is implemented by as underlined, italicized, and bolded text. The indication (234) may also be implemented with a predefined text color, such as red. The indication (234) is identifies a particular line of source code at which non-matching execution occurs.

The example GUI (124) of FIG. 2 also includes an indication (236) of matching execution in the menu bar (208). The indication (236) is implemented in the example of FIG. 2 with italicized text that states "* Matching Execution *" along with an icon. The icon may be configured to provide additional information describing the matching execution responsive to user interaction—a mouse-clock or pointer hover over the icon, for example.

Readers of skill in the art will recognize that the three indications (230, 234, and 236) depicted in the example GUI (124) of FIG. 2 are for example only, not limitation. Many other forms of indication may be implemented in GUIs that support software debugging with execution match determinations. Pop-up dialog boxes, text notifications, audio notifications, fonts, text styles, icons, images, and so on are all other example implementations of indications of matching or non-matching execution and each such example is well within the scope of the present invention.

The GUI items, menus, window panes, tabs, and so on depicted in the example client-specific GUI (124) of FIG. 2, are for explanation, not for limitation. Other GUI items, menu bar menus, drop-down menus, list-boxes, window panes, tabs, and so on as will occur to readers of skill in the art may be included in GUIs presented by debuggers configured for software debugging with execution match determinations in accordance with embodiments of the present invention.

As mentioned above, software debugging with execution match determinations may be carried out with a compiler and a debugger. For further explanation, therefore, FIG. 3 sets forth a flow chart illustrating an exemplary method for software debugging with execution match determinations according to embodiments of the present invention from the perspective of a compiler. To that end, the method of FIG. 3 includes inserting (302), by a compiler (122) while compiling source code into a debuggable program (120a), a phantom breakpoint (134a) at one or more lines of source code.

Figure 3:
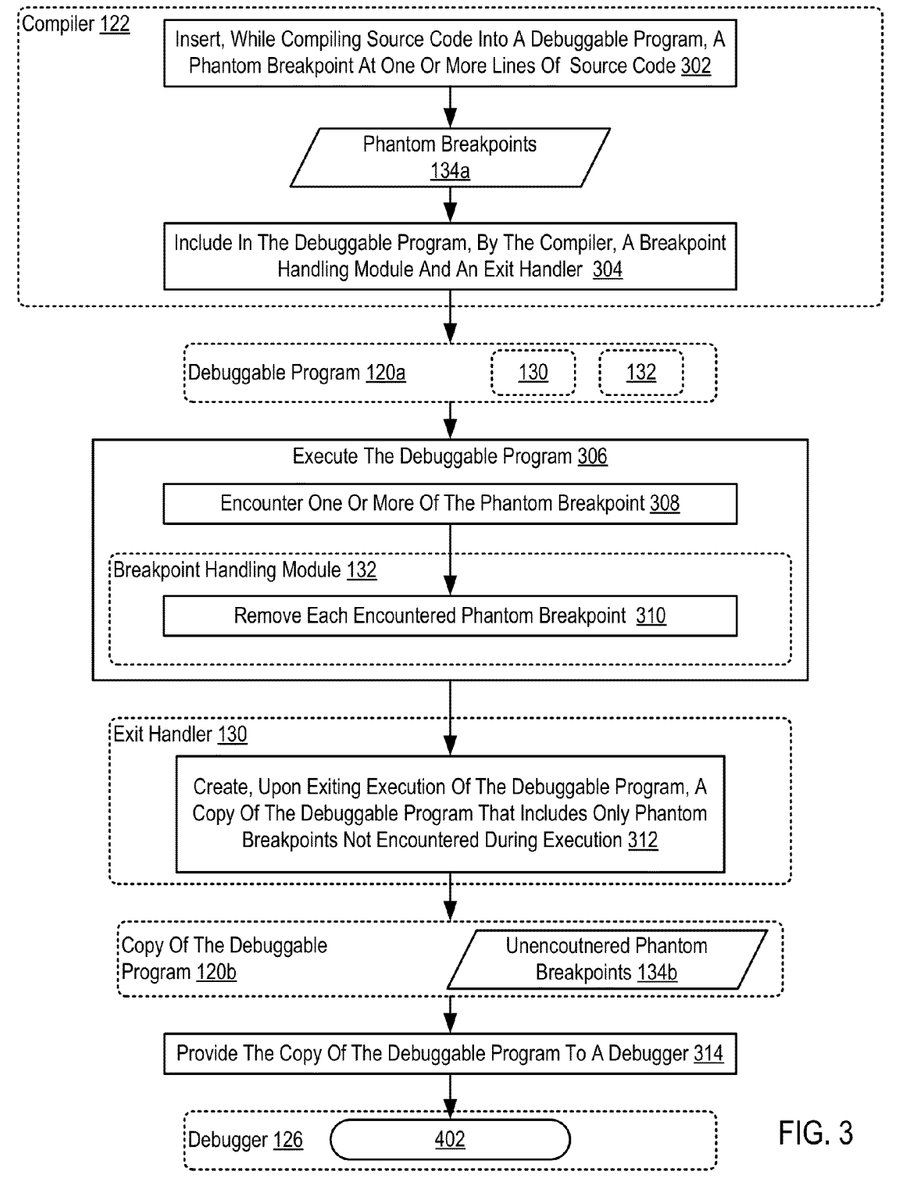
FIG. 3 sets forth a flow chart illustrating an exemplary method for software debugging with execution match determinations according to embodiments of the present invention from the perspective of a compiler.

The method of FIG. 3 continues by the compiler (122) including (304) in the debuggable program (120a) a breakpoint handling module (132) and an exit handler (130). Including (304) in the debuggable program (120a) a breakpoint handling module (132) and an exit handler (130) may be carried out in various ways such as, for example, including in an executable package forming the debuggable program—a .exe file for example—one or more dynamically linked libraries that include routines forming the breakpoint handling module and inserting linking instructions for the DLLs into the source code. When the debuggable program is executed, the linking instructions are executed and the DLLs are loaded for use by the debuggable program.

The method of FIG. 3 also includes executing (306) the debuggable program. Executing (306) the debuggable program may be carried out in various ways, including, for example, by a system level fork( ) call in a Unix™-style operating system environment. In the example of FIG. 3, executing (306) the debuggable program includes encountering (308) one or more of the phantom breakpoints (134a) and removing (310), by the breakpoint handling module (132), each encountered phantom breakpoint.

The method of FIG. 3 also includes creating (312), by the exit handler, upon exiting execution of the debuggable program, a copy (120b) of the debuggable program that includes only phantom breakpoints not encountered during execution. Creating (312) a copy (120b) of the debuggable program that includes only phantom breakpoints not encountered during execution may be carried out by examining a portion of the debuggable program in memory and the debuggable program (120a) on disk, identifying any lines of source code from which phantom breakpoints have been removed in memory but not from the disk, and generating the copy of the debuggable program so as to insure that the identified lines will not include phantom breakpoints in the copy and that all other lines having phantom breakpoints removed during execution also do not include phantom breakpoints in the copy. In the example of FIG. 3, the phantom breakpoints in the copy (120b) of the debuggable program are referred to as unencountered phantom breakpoints (134b) having not been encountered during the execution (306) outside debugger control.

The method of FIG. 3 continues by providing (314) the copy (120b) of the debuggable program to a debugger (126). In some embodiments providing the copy (120b) of the debuggable program also includes providing a compiler breakpoint table that lists only those phantom breakpoints remaining in the copy (120b). Providing the copy (120b) of the debuggable program to the debugger (126) may be carried out in various ways. The compiler may provide the copy (120b) through an application programming interface (API) exposed by the debugger for use by the compiler, by storing the copy (120b) in computer memory, by notifying the debugger of the copy's (120b) location in memory and so on as will occur to readers of skill in the art. After providing (314) the copy of the debuggable program to the debugger, the method of FIG. 3 continues to FIG. 4, step (402).

As mentioned above, FIG. 3 sets for a method of software debugging with execution match determinations from the perspective of the compiler. For further explanation, FIG. 4 sets forth a flow chart illustrating a further exemplary method for software debugging with execution match determinations according to embodiments of the present invention from the perspective of the debugger.

Figure 4:
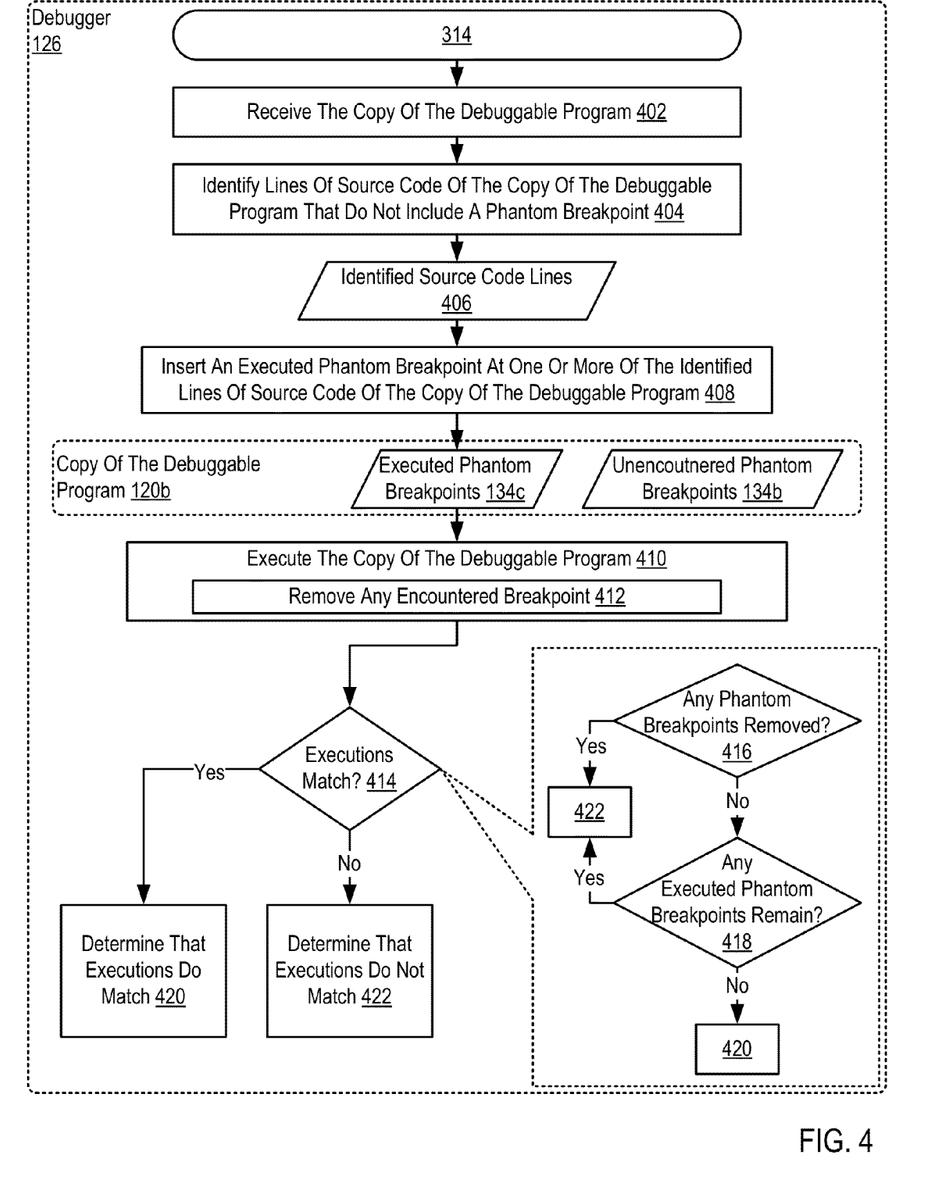
FIG. 4 sets forth a flow chart illustrating a further exemplary method for software debugging with execution match determinations according to embodiments of the present invention from the perspective of the debugger.

The method of FIG. 4 continues from the method of FIG. 3, after the compiler (122) provides (314) the copy of the debuggable program to the debugger (126). The method of FIG. 4 includes receiving (402) the copy (120b) of the debuggable program. Receiving (402) the copy (120b) of the debuggable program may be carried out by loading the debuggable program's source files, executing a process for the debuggable program, calling a system-level call such a ptrace( ) in Unix to attach the debugger to the process, and so on as will occur to readers of skill in the art.

The method of FIG. 4 also includes identifying (404), by the debugger (126), lines (406) of source code of the copy (120b) of the debuggable program that do not include a phantom breakpoint. Identifying (404) lines (406) of source code of the copy (120b) of the debuggable program that do not include a phantom breakpoint may be carried out in various ways. For example, the phantom breakpoints may be implemented as a predefined opcode well known to the debugger (126) and the debugger may search the source code for all lines that do not include the predefined opcode. As another example, consider embodiments in which the compiler provides, along with the copy (120b) of the debuggable program, a compiler breakpoint table that includes only those phantom breakpoints remaining the in copy when the debugger (126) loads the copy. Each entry in the compiler breakpoint table may include an identification of a source code line at which the phantom breakpoint represented by the entry is inserted. In such example embodiments, the debugger (126) may identify lines (406) of source code that do not include a phantom breakpoint by identifying all lines of source code not represented in the entries of the compiler breakpoint table.

The method of FIG. 4 also includes inserting (408), by the debugger (126), an executed phantom breakpoint (134c) at one or more of the identified lines (406) of source code of the copy of the debuggable program. Inserting (408) an executed phantom breakpoint (134c) may be carried out by replacing original source code at a line of source code with a predefined opcode representing an executed phantom breakpoint (134c), replacing original source code at a line of source code with a predefined opcode representing a breakpoint and indicating the breakpoint's type in the debugger's breakpoint table, replacing original source code at a line of source code with a predefined opcode representing a breakpoint and creating an entry in an executed phantom breakpoint table that includes entries only for executed phantom breakpoints, and in other ways as may occur to readers of skill in the art. Once original source code is removed (replaced by the executed phantom breakpoint), the original source code is stored and the storage location of the original source code is indicated in an entry in a breakpoint table.

The method of FIG. 4 also includes executing (410), by the debugger (126), the copy (120b) of the debuggable program. In the method of FIG. 4, executing (410) the copy (120b) includes removing (412) any phantom (134b) or executed phantom (134c) breakpoint. Removing (412) any phantom (134b) or executed phantom (134c) breakpoint may be carried out by replacing the breakpoint with original source code—source code stored during the insertion of the breakpoint.

After exiting execution (410) of the copy of the debuggable program, the method of FIG. 4 continues by determining (414), by the debugger (126), whether execution of the copy of the debuggable program matches the execution of the debuggable program. That is, the debugger determines whether execution under debugger control matches the preceding execution outside of debugger control. In the method of FIG. 4, determining (414) whether execution of the copy (120b) matches execution of the debuggable program is carried out by determining (416) whether any phantom breakpoints were removed during execution of the copy (120b) of the debuggable program. If any phantom breakpoints were removed during execution of the copy (120b), the debugger determines (422) that the executions do not match. If no phantom breakpoints were removed during execution of the copy (120b), the debugger then determines (418) whether any executed phantom breakpoint remains after exiting execution of the copy of the debuggable program. If any executed phantom breakpoint remains, the debugger (126) determines (422) that the executions do not match. If no executed phantom breakpoints remain, the debugger (126) in the example of FIG. 4, determines (420) that the executions do match.

The steps of determining (416) whether any phantom breakpoints were removed and determining (418) whether any executed phantom breakpoint remains are depicted in the example method of FIG. 4 in a particular order for ease and clarity of description, not limitation. Readers will understand that there is no limitation on the order for these two determinations. The debugger need only determine one of two things to identifying non-matching executions: that a phantom breakpoint was removed or that an executed phantom breakpoint remains. If either or both of these two conditions exist, the executions do not match.

Figure 5:
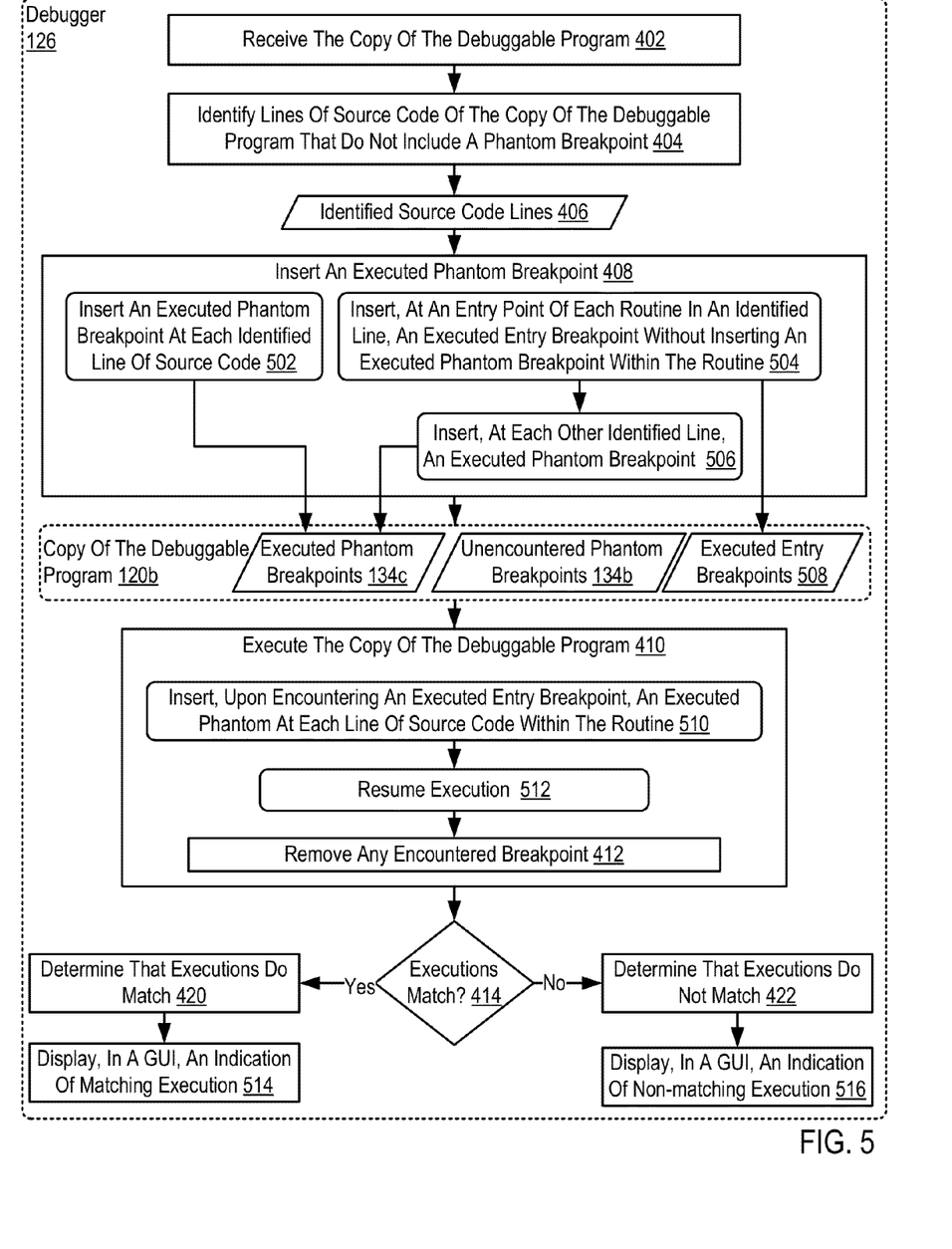
FIG. 5 sets forth a flow chart illustrating a further exemplary method for software debugging with execution match determinations according to embodiments of the present invention.

For further explanation, FIG. 5 sets forth a flow chart illustrating a further exemplary method for software debugging with execution match determinations according to embodiments of the present invention. The method of FIG. 5 is similar to the method of FIG. 4 including as it does: identifying (404) lines of source code that do not include a phantom breakpoint; inserting (408) an executed phantom breakpoint at one or more of the identified lines of source code; executing (410) the copy, removing (412) any phantom or executed phantom breakpoint; and determining (414) whether execution of the copy matches execution of the debuggable program.

The method of FIG. 5 differs from the method of FIG. 4, however, in that, two alternative methods of inserting (408) an executed phantom breakpoint at one or more of the identified lines of source code are depicted. In one method, the debugger inserting (502) an executed phantom breakpoint at each identified line of source code.

That is, for each line identified as not including a phantom breakpoint—a breakpoint originally inserted by the compiler and not removed during a preceding execution of debuggable program outside of debugger control—the debugger inserts an executed phantom breakpoint.

In another example method of inserting (408) an executed phantom breakpoint at one or more of the identified lines depicted in the example of FIG. 5, the debugger (126) inserts (506), at an entry point of each routine in an identified line (406) of source code, an executed entry breakpoint (508) without inserting an executed phantom breakpoint (134c) at lines of source code within the routine and inserting (506), at each other identified line of source code, an executed phantom breakpoint. Examples of entry points may include a jump, a branch, a functional call and so on as will occur to readers of skill in the art. An executed entry breakpoint represents a phantom breakpoint originally inserted by the compiler but encountered and removed during a previous execution, where the source code line of the breakpoint is an entry into a routine—such as a functional call, for example. In this method of inserting (408) executed phantom breakpoints, the debugger (126) may insert fewer total breakpoints than in the previous example method of insertion where a breakpoint is inserted at every identified line. That is, by not inserting executed phantom breakpoints within routines, the time needed to process the copy of the debuggable program upon receiving or loading the program (readying the program for debugging) may be reduced in comparison to implementations in which a breakpoint is inserted at each identified line of source code regardless of its location within a routine.

In the example of FIG. 5, when the debugger is configured to insert (504) an executed entry breakpoint at entry points of routines not having a phantom breakpoint, executing (410) the copy of the debuggable program includes encountering an executed entry breakpoint (508) a the entry point of a routine, thereby stopping execution of the copy (120b) of the debuggable program, inserting (510) an executed phantom at each line of source code within the routine, and resuming (512) execution. In this way, the executed entry breakpoint operates as a trigger to insert executed phantom breakpoints within a routine.

In addition to the various methods of inserting (408) an executed phantom breakpoint at one or more identified lines of source code, the method of FIG. 5 also includes displaying (514), by the debugger (126) in a GUI, an indication of matching execution if the executions match (420) and displaying (516), by the debugger (126) in the GUI, an indication of non-matching execution if the executions do not match (422). An indication of matching or non-matching execution may be implemented in various ways including, for example: as a text notification in a pop-up dialog box, a text notification embedded in a menu bar, as an icon or image (such as a green colored check, a yellow warning symbol, a red letter 'X') displayed in a location of the GUI designated for providing information regarding execution match determinations, as an audible notification (such as a buzzer, a bell, a human voice, and the like), as a combination of any of these examples, and in many other ways as will occur to readers of skill in the art.

Figure 6:
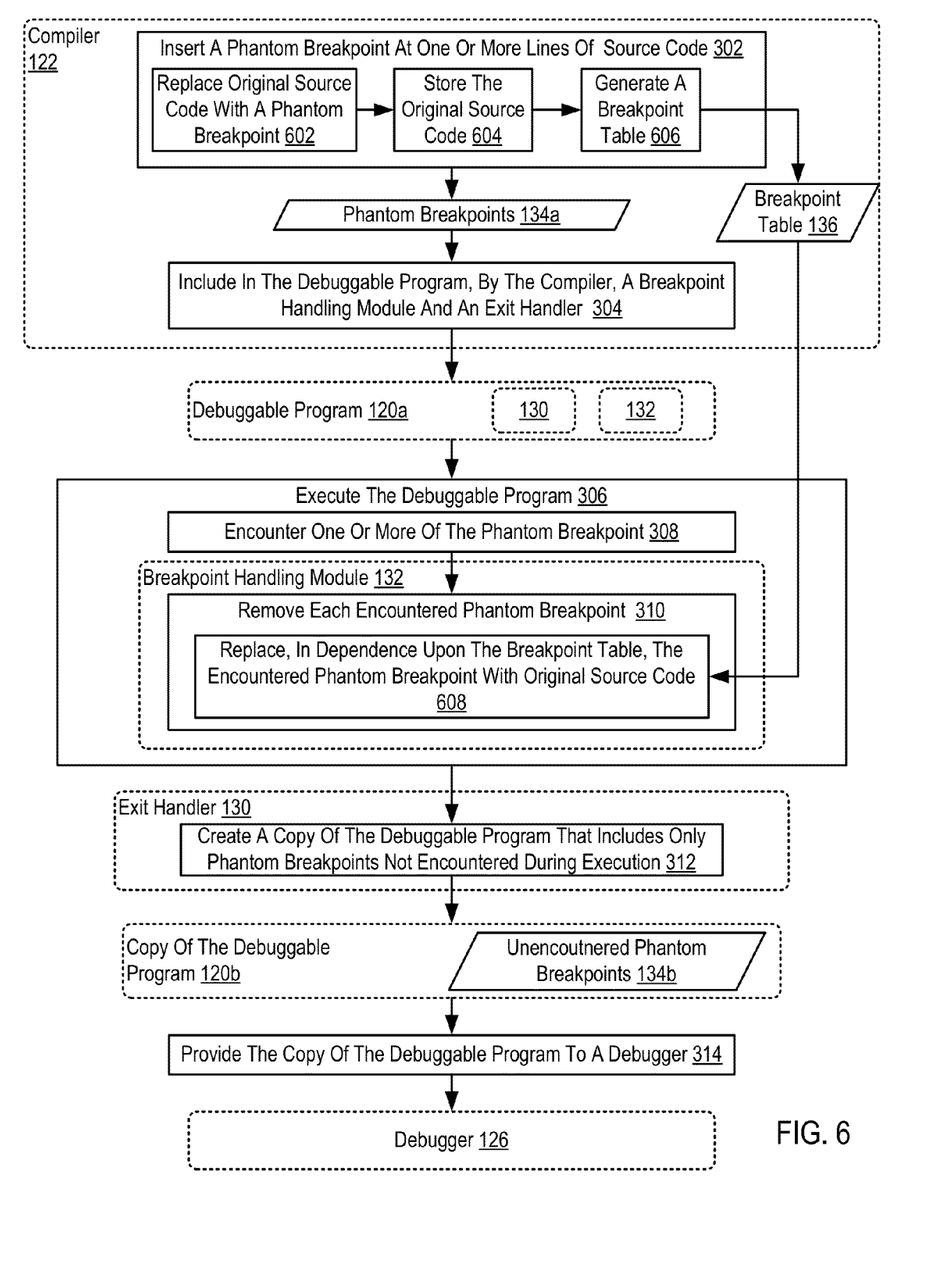
FIG. 6 sets forth a flow chart illustrating a further exemplary method for software debugging with execution match determinations according to embodiments of the present invention.

For further explanation, FIG. 6 sets forth a flow chart illustrating a further exemplary method for software debugging with execution match determinations according to embodiments of the present invention. The method of FIG. 6 is similar to the method of FIG. 3 including as it does: inserting (302) a phantom breakpoint at one or more lines of source code, including (304) a breakpoint handling module and an exit handler in the debuggable program; executing (306) the debuggable program, encountering (308) and removing (310) phantom breakpoints; creating (312) a copy (120b) of the debuggable program that includes only phantom breakpoints not encountered during execution; and providing the copy to a debugger.

The method of FIG. 6 differs from the method of FIG. 3, however, in that in the method of FIG. 6 inserting (302) a phantom breakpoint (134a) at one or more lines of source code is carried out by replacing (602), at the one or more lines of source code, original source code with a phantom breakpoint (134a), storing (604) the original source code, and generating (606) a breakpoint table (136). In the example of FIG. 6, the breakpoint table (136) includes an entry for each phantom breakpoint inserted in the source code. Each entry in the breakpoint table (136) references the original source code replaced by the phantom breakpoint. Each entry also identifies a source code line at which the phantom breakpoint was inserted.

Also in the method of FIG. 6, removing (310) each phantom breakpoint encountered during execution includes replacing (608), in dependence upon the breakpoint table (136), the encountered phantom breakpoint with original source code. That is, the breakpoint handling module (132), upon an encounter of a phantom breakpoint, may identify the source code line at which the encounter of the phantom breakpoint occurred and search the breakpoint table (136) for an entry that identifies that line of source code, using the source code identification as a type of index into the breakpoint table. Once located, the breakpoint handling module may utilize the reference—such as a pointer to a memory location—to original source code stored in the entry to retrieve the original source code. The breakpoint handling module may then overwrite the phantom breakpoint with the retrieved original source code.

In view of the explanations set forth above, readers will recognize that the benefits of software debugging with execution match determinations according to embodiments of the present invention include:

Providing software developers an indication of whether a present execution under debugger control matches a previous execution, outside of debugger control, in which an error occurred.

Identifying a location where a present execution under debug control no longer matches a previous execution.

And others as will occur to readers of skill in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of software debugging with execution match determinations, the method comprising:
   inserting, by a compiler while compiling source code into a debuggable program, a phantom breakpoint at every line of source code;
   including in the debuggable program, by the compiler, a breakpoint handling module and an exit handler;
   executing the debuggable program including encountering one or more of the phantom breakpoints and removing, by the breakpoint handling module, each encountered phantom breakpoint;
   creating, by the exit handler, upon exiting execution of the debuggable program, a copy of the debuggable program that includes only phantom breakpoints not encountered during execution;
   providing the copy of the debuggable program to a debugger;
   identifying, by the debugger, lines of source code of the copy of the debuggable program that do not include a phantom breakpoint;
   inserting, by the debugger, an executed phantom breakpoint at one or more of the identified lines of source code of the copy of the debuggable program;
   executing, by the debugger, the copy of the debuggable program including, removing any phantom or executed phantom breakpoint; and
   after exiting execution of the copy of the debuggable program, determining, by the debugger, whether execution of the copy of the debuggable program matches the execution of the debuggable program including, determining that the executions do not match if any phantom breakpoints were removed during execution of the copy of the debuggable program or any executed phantom breakpoint remains after exiting execution of the copy of the debuggable program.

2. The method of claim 1, wherein:
   inserting a phantom breakpoint at every line of source code further comprises: replacing, at every line of source code, original source code with a phantom breakpoint, storing the original source code, and generating a breakpoint table, the breakpoint table comprising an entry for each phantom breakpoint inserted in the source code, each entry in the breakpoint table referencing the original source code replaced by the phantom breakpoint; and
   removing each encountered phantom breakpoint further comprises replacing, in dependence upon the breakpoint table, the encountered phantom breakpoint with original source code.

3. The method of claim 1, wherein inserting an executed phantom breakpoint at one or more of the identified lines of source code further comprises inserting an executed phantom breakpoint at each identified line of source code.

4. The method of claim 1, wherein:
   inserting an executed phantom breakpoint at one or more of the identified lines of source code further comprises: inserting, at an entry point of each routine in an identified line of source code, an executed entry breakpoint without inserting an executed phantom breakpoint at lines of source code within the routine and inserting, at each other identified line of source code, an executed phantom breakpoint; and
   executing the copy of the debuggable program further comprises: upon encountering an executed entry breakpoint at an entry point of a routine thereby stopping execution, inserting an executed phantom breakpoint at each line of source code within the routine and resuming execution.

5. The method of claim 1, further comprising:
if the executions match, displaying, by the debugger in a graphical user interface ('GUI'), an indication of matching execution; and
if the executions do not match, displaying, by the debugger in the GUI, an indication of non-matching execution.

6. An apparatus for software debugging with execution match determinations, the apparatus comprising a computer processor and a computer memory operatively coupled to the computer processor, the computer memory having disposed within it computer program instructions that, when executed by the computer processor, cause the apparatus to carry out the steps of:
inserting, by a compiler while compiling source code into a debuggable program, a phantom breakpoint at every line of source code;
including in the debuggable program, by the compiler, a breakpoint handling module and an exit handler;
executing the debuggable program including encountering one or more of the phantom breakpoints and removing, by the breakpoint handling module, each encountered phantom breakpoint;
creating, by the exit handler, upon exiting execution of the debuggable program, a copy of the debuggable program that includes only phantom breakpoints not encountered during execution;
providing the copy of the debuggable program to a debugger;
identifying, by the debugger, lines of source code of the copy of the debuggable program that do not include a phantom breakpoint;
inserting, by the debugger, an executed phantom breakpoint at one or more of the identified lines of source code of the copy of the debuggable program;
executing, by the debugger, the copy of the debuggable program including, removing any phantom or executed phantom breakpoint; and
after exiting execution of the copy of the debuggable program, determining, by the debugger, whether execution of the copy of the debuggable program matches the execution of the debuggable program including, determining that the executions do not match if any phantom breakpoints were removed during execution of the copy of the debuggable program or any executed phantom breakpoint remains after exiting execution of the copy of the debuggable program.

7. The apparatus of claim 6, wherein:
inserting a phantom breakpoint at every line of source code further comprises: replacing, at every line of source code, original source code with a phantom breakpoint, storing the original source code, and generating a breakpoint table, the breakpoint table comprising an entry for each phantom breakpoint inserted in the source code, each entry in the breakpoint table referencing the original source code replaced by the phantom breakpoint; and
removing each encountered phantom breakpoint further comprises replacing, in dependence upon the breakpoint table, the encountered phantom breakpoint with original source code.

8. The apparatus of claim 6, wherein inserting an executed phantom breakpoint at one or more of the identified lines of source code further comprises inserting an executed phantom breakpoint at each identified line of source code.

9. The apparatus of claim 6, wherein:
inserting an executed phantom breakpoint at one or more of the identified lines of source code further comprises:
inserting, at an entry point of each routine in an identified line of source code, an executed entry breakpoint without inserting an executed phantom breakpoint at lines of source code within the routine and inserting, at each other identified line of source code, an executed phantom breakpoint; and
executing the copy of the debuggable program further comprises: upon encountering an executed entry breakpoint at an entry point of a routine thereby stopping execution, inserting an executed phantom breakpoint at each line of source code within the routine and resuming execution.

10. The apparatus of claim 6, further comprising computer program instructions that, when executed by the computer processor, cause the apparatus to carry out the steps of:
if the executions match, displaying, by the debugger in a graphical user interface ('GUI'), an indication of matching execution; and
if the executions do not match, displaying, by the debugger in the GUI, an indication of non-matching execution.

11. A computer program product for software debugging with execution match determinations, the computer program product disposed upon a computer readable memory, wherein the computer readable memory is not a signal, the computer program product comprising computer program instructions that, when executed, cause a computer to carry out the steps of:
inserting, by a compiler while compiling source code into a debuggable program, a phantom breakpoint at every line of source code;
including in the debuggable program, by the compiler, a breakpoint handling module and an exit handler;
executing the debuggable program including encountering one or more of the phantom breakpoints and removing, by the breakpoint handling module, each encountered phantom breakpoint;
creating, by the exit handler, upon exiting execution of the debuggable program, a copy of the debuggable program that includes only phantom breakpoints not encountered during execution;
providing the copy of the debuggable program to a debugger;
identifying, by the debugger, lines of source code of the copy of the debuggable program that do not include a phantom breakpoint;
inserting, by the debugger, an executed phantom breakpoint at one or more of the identified lines of source code of the copy of the debuggable program;
executing, by the debugger, the copy of the debuggable program including, removing any phantom or executed phantom breakpoint; and
after exiting execution of the copy of the debuggable program, determining, by the debugger, whether execution of the copy of the debuggable program matches the execution of the debuggable program including, determining that the executions do not match if any phantom breakpoints were removed during execution of the copy of the debuggable program or any executed phantom breakpoint remains after exiting execution of the copy of the debuggable program.

12. The computer program product of claim 11, wherein:
inserting a phantom breakpoint at every line of source code further comprises: replacing, at every line of source code, original source code with a phantom breakpoint, storing the original source code, and generating a breakpoint table, the breakpoint table comprising an entry for each phantom breakpoint inserted in the source code, each entry in the breakpoint table referencing the original source code replaced by the phantom breakpoint; and
removing each encountered phantom breakpoint further comprises replacing, in dependence upon the breakpoint table, the encountered phantom breakpoint with original source code.

13. The computer program product of claim 11, wherein inserting an executed phantom breakpoint at one or more of the identified lines of source code further comprises inserting an executed phantom breakpoint at each identified line of source code.

14. The computer program product of claim 11, wherein:
inserting an executed phantom breakpoint at one or more of the identified lines of source code further comprises: inserting, at an entry point of each routine in an identified line of source code, an executed entry breakpoint without inserting an executed phantom breakpoint at lines of source code within the routine and inserting, at each other identified line of source code, an executed phantom breakpoint; and
executing the copy of the debuggable program further comprises: upon encountering an executed entry breakpoint at an entry point of a routine thereby stopping execution, inserting an executed phantom breakpoint at each line of source code within the routine and resuming execution.

15. The computer program product of claim 11, further comprising computer program instructions that, when executed by the computer processor, cause the apparatus to carry out the steps of:
if the executions match, displaying, by the debugger in a graphical user interface ('GUI'), an indication of matching execution; and
if the executions do not match, displaying, by the debugger in the GUI, an indication of non-matching execution.

16. A method of software debugging with execution match determinations, the method comprising:
receiving, by a debugger from a compiler, a copy of a debuggable program, the debuggable program comprising one or more phantom breakpoints not encountered during a previous execution of the debuggable program, each phantom breakpoint inserted at a separate line of source code;
identifying, by the debugger, lines of source code of the copy of the debuggable program that do not include a phantom breakpoint;
inserting, by the debugger, an executed phantom breakpoint at one or more of the identified lines of source code of the copy of the debuggable program;
executing, by the debugger, the copy of the debuggable program including, removing any phantom or executed phantom breakpoint; and
after exiting execution of the copy of the debuggable program, determining, by the debugger, whether execution of the copy of the debuggable program matches the execution of the debuggable program including, determining that the executions do not match if any phantom breakpoints were removed during execution of the copy of the debuggable program or any executed phantom breakpoint remains after exiting execution of the copy of the debuggable program.

17. The method of claim 16, further comprising:
if the executions match, displaying, by the debugger in a graphical user interface ('GUI'), an indication of matching execution; and
if the executions do not match, displaying, by the debugger in the GUI, an indication of non-matching execution.

18. The method of claim 16, further comprising:
inserting, by the compiler while compiling source code into a debuggable program, a phantom breakpoint at every line of source code;
including in the debuggable program, by the compiler, a breakpoint handling module and an exit handler;
executing the debuggable program including encountering one or more of the phantom breakpoints and removing, by the breakpoint handling module, each encountered phantom breakpoint;
creating, by the exit handler, upon exiting execution of the debuggable program, the copy of the debuggable program that includes only phantom breakpoints not encountered during execution; and
providing the copy of the debuggable program to the debugger.

* * * * *